United States Patent [19]

Jassby et al.

[11] Patent Number: 4,626,400

[45] Date of Patent: Dec. 2, 1986

[54] VARIABLE CONTROL OF NEUTRON ALBEDO IN TOROIDAL FUSION DEVICES

[75] Inventors: Daniel L. Jassby; Bradley J. Micklich, both of Princeton, N.J.

[73] Assignee: The United States of America as represented by the United States Department of Energy, Washington, D.C.

[21] Appl. No.: 500,199

[22] Filed: Jun. 1, 1983

[51] Int. Cl.$^4$ .............................................. G21B 1/00
[52] U.S. Cl. ..................................... 376/146; 376/150
[58] Field of Search .............................. 376/146, 150

[56] References Cited

U.S. PATENT DOCUMENTS

| 4,343,761 | 8/1982 | Harkness | 376/324 |
| 4,344,911 | 8/1982 | Maniscalco et al. | 376/146 |
| 4,363,775 | 12/1982 | Bussard et al. | 376/146 |
| 4,430,291 | 2/1984 | Chi | 376/146 |

FOREIGN PATENT DOCUMENTS

| 526793 | 3/1954 | Belgium | 376/335 |

OTHER PUBLICATIONS

Lee et al., "Fission-Suppressed Blankets for Fissile Fuel Breeding Fusion Reactors", Journal of Fusion Energy, vol. 1, No. 3, 1981.

Primary Examiner—Deborah L. Kyle
Assistant Examiner—Richard W. Wendtland
Attorney, Agent, or Firm—Bruce R. Mansfield; Paul A. Gottlieb; Judson R. Hightower

[57] ABSTRACT

An arrangement is provided for controlling neutron albedo in toroidal fusion devices having inboard and outboard vacuum vessel walls for containment of the neutrons of a fusion plasma. Neutron albedo material is disposed immediately adjacent the inboard wall, and is movable, preferably in vertical directions, so as to be brought into and out of neutron modifying communication with the fusion neutrons. Neutron albedo material preferably comprises a liquid form, but may also take pebble, stringer and curtain-like forms. A neutron flux valve, rotatable about a vertical axis is also disclosed.

20 Claims, 23 Drawing Figures

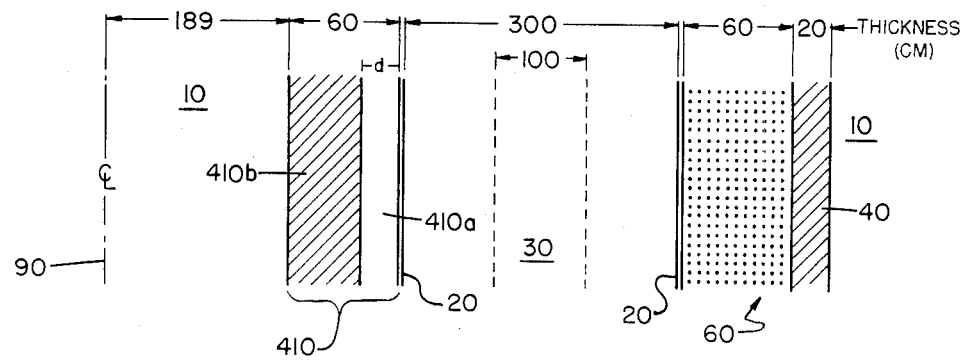
FIG. 4c
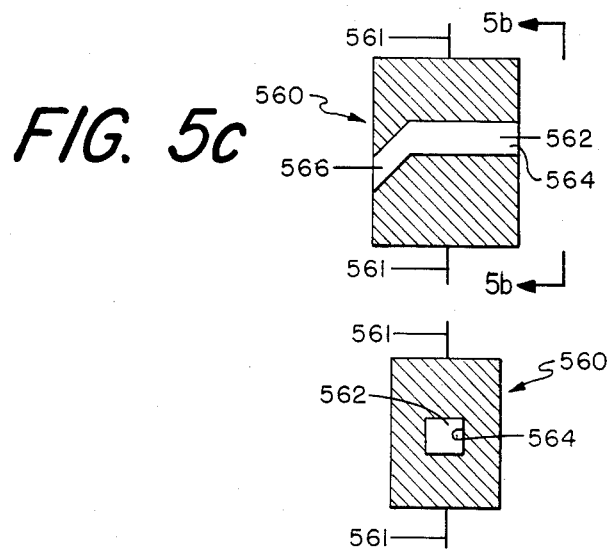
FIG. 5c
FIG. 5d

VARIABLE CONTROL OF NEUTRON ALBEDO IN TOROIDAL FUSION DEVICES

CONTRACTUAL ORIGIN OF THE INVENTION

The United States Government has rights in this invention pursuant to Contract No. DE-AC02-76CH03073 between the U.S. Department of Energy and the Princeton University.

BACKGROUND OF THE INVENTION

This invention pertains to methods of controlling in the steady state, neutron albedo in toroidal fusion devices, and in particular, to methods of controlling the flux and energy distribution of collided neutrons which are incident on an outboard wall of a toroidal fusion device.

A number of approaches are currently being studied in the development of nuclear fusion as a long-term energy source. Several of the more promising approaches involve the confinement by means of strong magnetic fields of a highly energetic plasma possessing extremely high temperatures and densities so as to cause the fusing of atomic nuclei, such as deuterons and tritons, and the resulting production of energy.

It has been found that one of the most efficient configurations for optimum plasma containment is in the form of a toroid or "doughnut". This has given rise to the tokamak fusion reactor design which is currently under intensive study by research groups in a number of countries. By means of a circular arrangement of powerful magnets, the toroidal magnetic field for confining an energetic plasma is formed. In addition to tokamaks, other toroidal plasma devices such as stellerators, levitrons, spherators, floating-ring multipoles and the like toroidal devices, are being considered.

It is important to investigate during the operation of early plasma confinement devices, and in other situations where high energy neutron environments are encountered, the effects of a fusion radiation environment on containment materials, reactor hardware, and associated equipment, such as electronic circuits and electrical control devices. Hence, a principal objective of early fusion plasma devices is to provide a radiation effects facility for conducting nuclear radiation damage and hardening programs in fast neutron environments. Tokamak fusion generators provide a much larger uniformly irradiated test volume, and can give more faithful spectral simulations of thermonuclear environments than accelerator-driven point neutron sources or pulsed fastfission reactors. Further, radiation effects facilities provide a simulated high-energy neutron environment for generalized studies of the effects of that environment on biological, metallurgical and chemical systems. Tokamak test facilities of this type, according to present designs, are long-pulsed sources, producing relatively low neutron dose rates (approximately $10^5$ rads/s) that limit application of these facilities to damage programs with devices and subsystems that are sensitive to integrated radiation dose, rather than dose rate. The relatively low neutron dose rates inherent in next-generation tokamak operation must be enhanced at given test regions if the facility is to provide a useful test environment. Toroidal confinement devices will typically provide test locations for radiation test modules lying just outside the more accessible outboard boundary of the plasma containment vessel.

To meet a variety of simulation requirements, radiation effects facilities should provide a control over the neutron energy spectrum distribution, as well as the ratio of gamma flux to neutron flux. Exact simulation of gamma-ray fields is of secondary importance in tokamak-type radiation effects facilities because many other facilities offer gamma fields of much higher intensity. Nonetheless, a substantial gamma field will exist in a tokamak environment, and if neutron damage effects are to be more completely isolated, the gamma fields must be suppressed.

In a controlled thermonuclear reactor, the neutron flux must be relied upon to provide a sufficient level of tritium breeding, tritium being one of the principal fuel components of a D-T fusion reactor. In toroidal reactors, especially with magnetic divertors, tritium breeding blanket modules will not completely cover the plasma containment vessel. It is important that tritium breeding be maximized wherever breeding regions exist, in order to have adequate tritium production, and albedo control is necessary to increase the neutron flux on these breeding modules. Breeding enhancement is especially important in producton reactors where, because of space limitations, only limited areas are available for tritium breeding modules. In smaller reactors where access to the inboard blanket shield region is difficult, the placement of tritium breeding blankets may have to be limited to selected outboard portions of the reactor.

Also, the neutron flux generated in a controlled thermonuclear reactor provides a fast neutron beam output of increased energy and density levels required for general research. As a research tool, it is particularly important that the energy spectrum of the output neutron beam be tailored for specific experiments. For example, the need for beam outputs having larger uncollided neutron components, that is a beam with purer spectrum, has been recognized.

It is therefore an object of the present invention to provide a means for variably controlling neutron albedo in a toroidal fusion device so as to control the tritium breeding, neutron energy distribution, and ratio of gamma flux to neutron flux in the outboard regions of a toroidal fusion device, as well as controlling the energy spectrum of output beams of such devices.

SUMMARY OF THE INVENTION

These and other objects of the present invention are provided in a toroidal fusion plasma device, such as a tokamak radiation effects facility, wherein test specimens are irradiated by fusion neutrons. In the present invention, the test specimens are located in predetermined portions of the tokamak outboard wall. The present invention enhances the neutron dose, while controlling the flux or energy spectrum of collided neutrons which are incident on an outboard wall of a toroidal plasma device. Control is achieved by moving appropriate neutron albedo materials, located behind an inboard wall of the device, into and out of communication with the fusion neutrons. The different neutron albedo materials reflect fusion neutrons of different flux and energy spectra. Modification occurs between steady state operating modes, i.e. during reactor reconfiguration, and does not comprise transient reactor control means.

In a first embodiment, neutron albedo materials of particular configuration and compositions are mounted for movement by albedo transport systems which provide a means of introducing, as well as removing, the neutron albedo materials from non-productive structural areas, e.g. inboard reactor walls. For example, neutron albedo materials may take on liquified, pebbled, curtained, and stringer forms so as to be movable in vertical directions for positioning adjacent the inboard wall of the plasma device. Neutron albedo material may be comprised of neutron reflector material, neutron absorber material, neutron multiplying material, as well as material which also suppresses gamma radiation.

In an alternative embodiment, the neutron albedo control material located in the inward wall of a toroidal plasma device comprises a flux valve of neutron-reflecting material having a duct formed therein for communication with the vacuum containment vessel. The duct provides a channel between the evacuated region and an inboard located neutron dump. The flux valve is rotated or otherwise displaced so as to remove communication of the channel with the fusion neutrons located in the vacuum containment vessel.

Neutron albedo materials may be arranged in layers adjacent to the inboard plasma device wall to provide the selected energy spectrum, multiplication, reflection, and other desired properties such as absorption, and moderation, depending on the particular toroidal device application device involved.

BRIEF DESCRIPTION OF THE DRAWINGS

In the drawings, wherein like elements are referenced alike:

FIG. 6 shows the effect of a plasma vessel wall on the transmission of fusion neutrons, wherein

DESCRIPTION OF THE PREFERRED EMBODIMENT

Figure 1A:
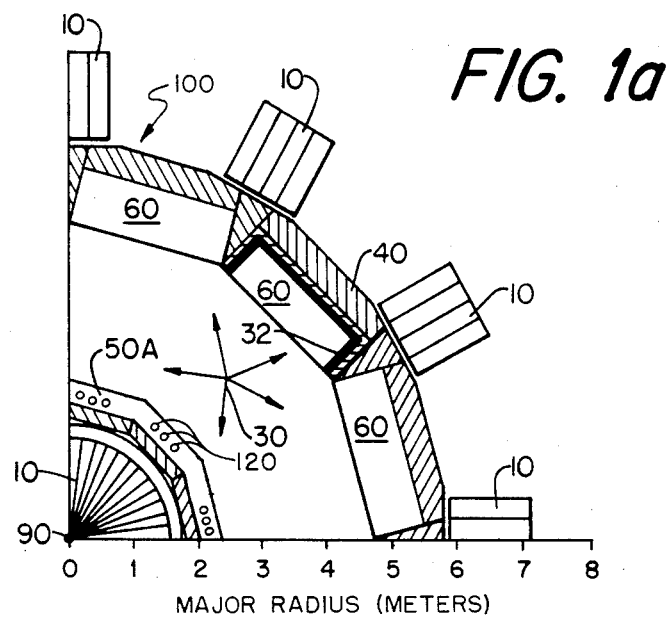
FIGS. 1-5 are partial plan and elevational cross-sectional views of an inboard region of a tokamak radiation-effects facility having five different examples of albedo control according to the invention, wherein the albedo controls are of the liquid, pebble, stringer, layered curtain, and flux valve types, respectively.

The arrangement of the present inventions finds immediate application in radiation effects test facilities (which are also termed "simulation facilities"). Referring to FIGS. 1-5, a typical radiation effects facility of the tokamak fusion type is shown with five alternative albedo control arrangements according to the present invention, incorporated therein. After a brief introduction describing the general features of the test facility, performance criteria and exemplar applications of the present invention will be discussed. Thereafter, a detailed description of the arrangement of FIGS. 1-5 will follow.

The fusion device of FIGS. 1-5 is fully described in a report entitled, "FED-R, A Fusion Engineering Device Utilizing Resistive Magnets", *Fusion Engineering Design Center Report*, No. ORNL/FEDC-82/1, Oak Ridge, Tennessee, issued April, 1983. The described near-term test reactor is designed to hold radiation test modules just outside the boundary of the vacuum vessel, an evacuated chamber holding the reacting plasma.

In FIGS. 1-5 wherein like components are referenced alike, a tokamak test facility comprises a toroidal fusion device which includes a toroidal field coil 10 and vacuum vessel 20, for magnetically confining and maintaining an uncontaminated environment for a fusion plasma 30 which consists of energetic electrons, ions, neutrons, as well as a variety of energetic waves. Plasma 30 is surrounded by an incomplete shield wall 40, which covers all but an inboard region 45. A test module 60 is located between vacuum vessel 20 and the outboard portion of shell 40. A pumping duct 70 provides communication between the plasma and impurity removal systems, as well as continuous fueling and other conventional systems necessary to maintain fusion device operation. Poloidal field coils 80a and 80b help to confine and stabilize plasma 30. Numeral 90 refers to the machine centerline of the toroidal fusion device.

The test modules 60 are restricted to the outboard region of the vacuum vessel for ease of retrieval and placement of specimens (samples) to be studied. Nevertheless, approximately fifty square meters of first-wall area are available for ready illumination by fusion neutrons. Test assemblies, each up to hundreds of liters in volume, can accommodate a very large number of devices, circuits and subsystems for simultaneous exposure to a nearly uniform neutron radiation field. The opportunity for uniform exposure of many samples of the same type allows determination of a minimum dose that results in radiation damage, by removing the samples one at a time, after each of a series of fusion pulses, for mechanical and electrical tests. Transient effects on electronic devices and other components can be evaluated by in-situ monitoring.

Unlike present tokamak-type toroidal plasma device designs, the vacuum vessel of a radiation effects facility must be designed for an unimpeded fusion-neutron illumination of test modules. The test modules should also be as free as possible of uncontrolled neutron scattering from nearby major tokamak components. Certain design features thereby become apparent, including the avoidance of locating a port nozzle in front of a test module region, and a minimum depth of at least 80 centimeters for test module regions located in the bore of a toroidal-field magnet. Further, several adjacent bays should be dedicated to nuclear testing, to facilitate the installation of large systems, when required. At least one bay should be suitable for extraction of a fast-neutron beam of 30 centimeters to one meter or more in diameter. The total thickness of the vessel wall, with its protective tiling in front of the test modules, should be minimized in order to enhance "transparency" of the vessel to fusion neutrons.

Figure 6A:
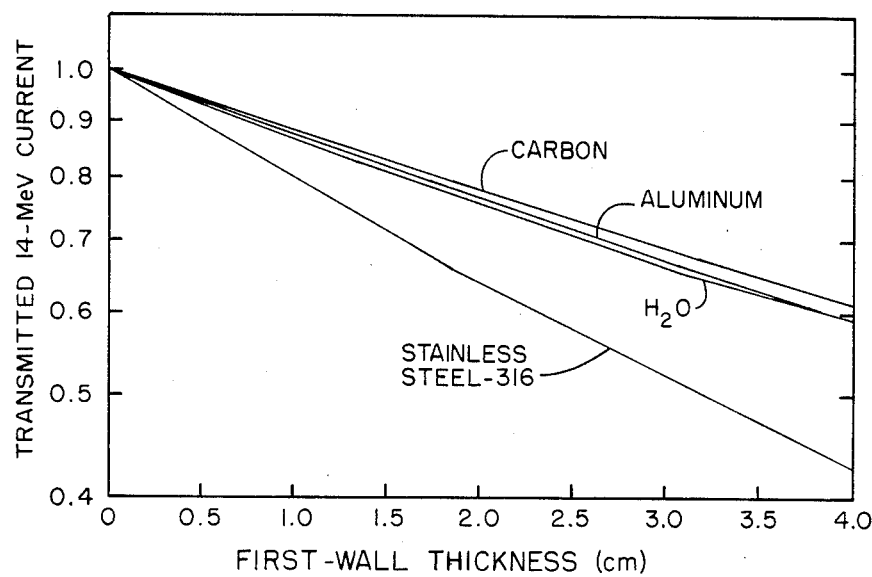
FIG. 6a shows the calculated attenuation of neutron radiation as a function of first-wall thickness and material composition.
Figure 6B:
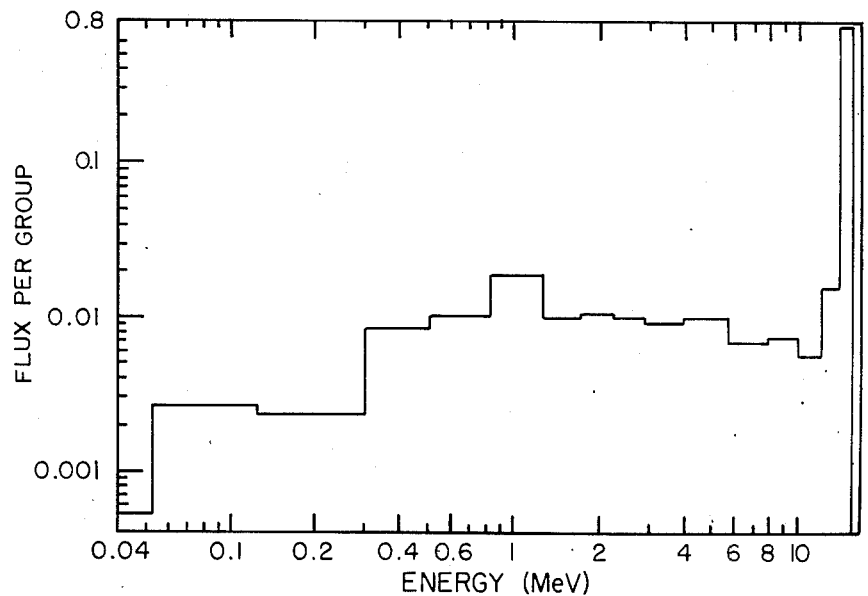
FIG. 6b shows a neutron spectrum after transmission through a typical first-wall of a radiation test module.
Figure 7:
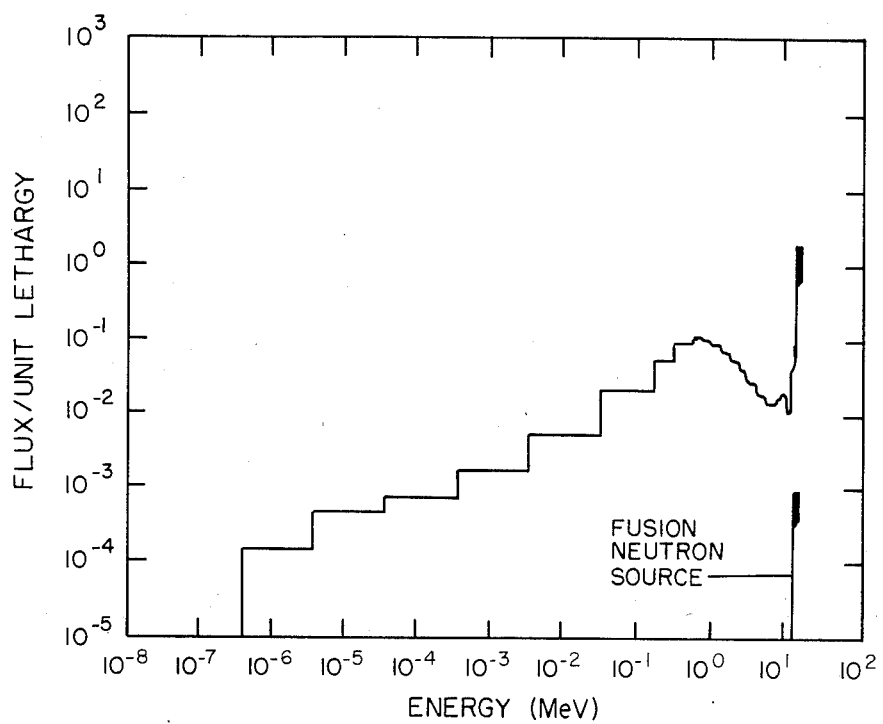
FIG. 7 shows the neutron flux spectrum at the front face of a radiation test module.
Figure 8A:
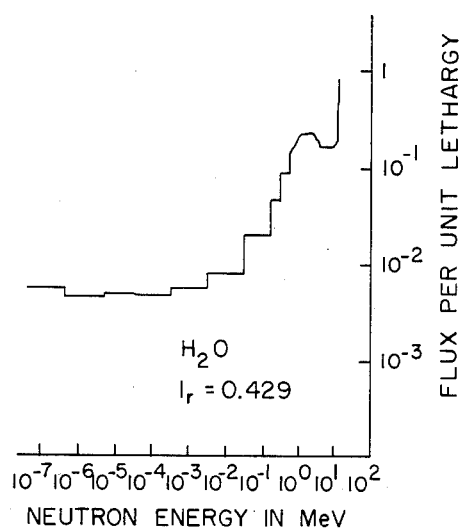
FIGS. 8a-8f show energy distributions of neutrons emerging from uniformly thick slabs of varying material compositions.
Figure 8B:
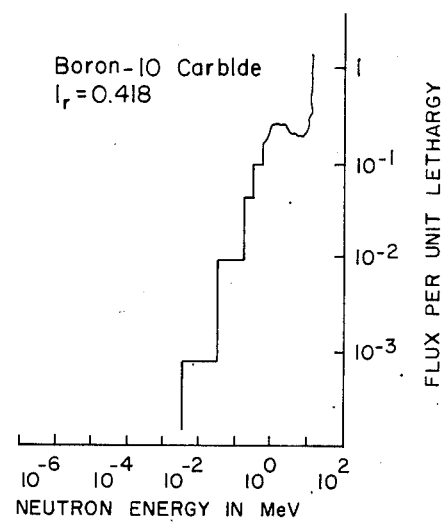
Figure 8C:
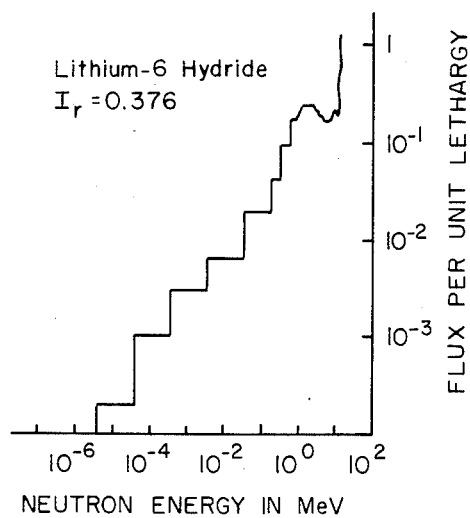
Figure 8D:
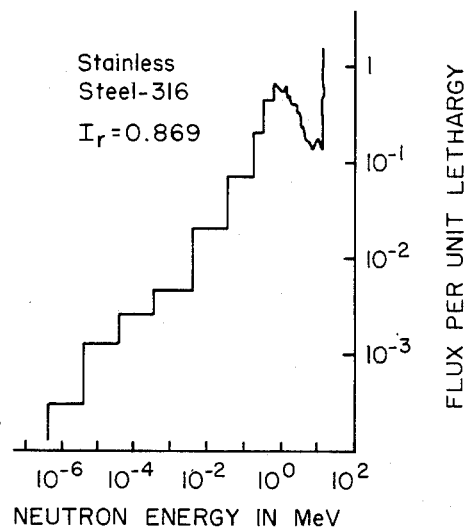
Figure 8E:
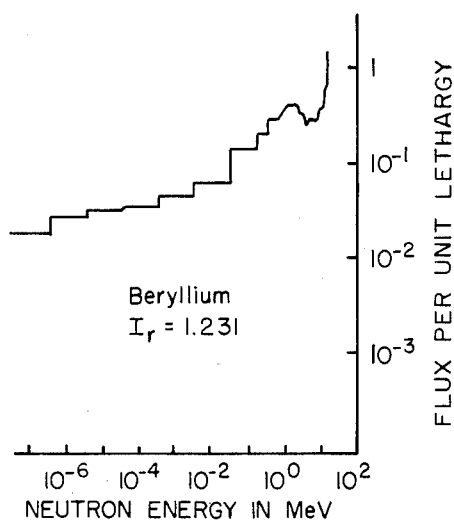
Figure 8F:
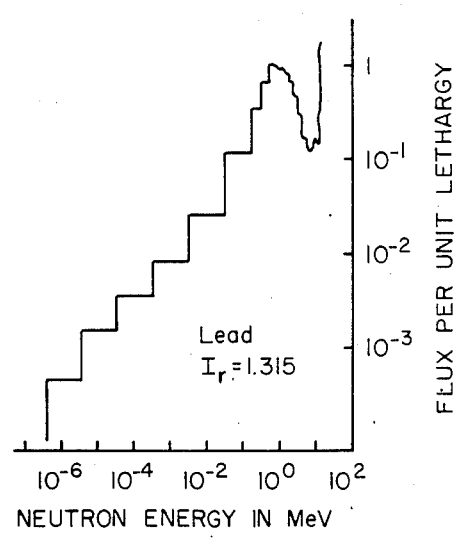

Several graphs are shown to illustrate the test environment of a typical radiation test facility. FIG. 6(a) shows the calculated attenuation of incident 14-MEV neutron radiation as a function of first-wall thickness for various materials (as set forth in the aforementioned article of the Fusion Engineering Design Center in Oak Ridge, Tennessee). Related FIG. 6(b) shows the neutron spectrum after transmission through a one centimeter thick slab of stainless steel no. 316. This wall thickness, or its transparency equivalent (in terms of other materials), is about the minimum practical value, based on structural and heat removal requirements, and would require the use of helium or some other gas as the wall coolant medium. FIG. 7 shows the calculated neutron spectrum for a point located at the front face of a test module (just outside the plasma vessel of the tokamak fusion test reactor), currently under construction at the Princeton Plasma Physics Laboratory, and described in an article entitled, "Estimated Neutron Activation data for TFTR", Part I, by L. P. Ku, and J. G. Kolibal, *Princeton Plasma Physics Laboratory Report,* PPPL, 1847, Nov. 1981.

The present invention meets the critical need to be able to vary the ambient neutron field by reconfiguring the plasma device, i.e. by changing the materials located inboard of the reacting plasma, as will be explained more fully herein with reference to FIGS. 1–5. The ability to change the composition of reactor components near a test module also provides flexibility in tailoring the ambient gamma-ray field. Substitution of materials behind the first wall, and of reactor components other than magnets, can be made without noticably affecting the fusion neutron source intensity or the pulse length (duration of plasma energization). However, all materials employed in albedo control must be nonmagnetic.

It is important that a simulation test facility be capable of producing at the test modules, radiation spectral characteristics that are as close as possible to the corresponding properties of the environment to be simulated, as explained in *Fundamentals of Nuclear Hardening of Electronic Equipment* by L. W. Ricketts, Wiley-Interscience, New York, 1972. Characteristics of interest include neutron energy distribution and neutron-to-gamma dose ratio. The present invention, as will be seen, provides the necessary control.

The neutron flux spectrum incident on the outboard vessel wall has two components: uncollided fusion neutrons; and neutrons scattered from reactor components (mainly from the region inboard of the plasma and approximately opposite the test module space, as described by E. T. Chenge and B. A. Engholm, *Transactions of American Nuclear Society,* Volume 38, pages 217 and 218, 1981). According to the present invention, substantial changes in the second component, that of scattered neutrons, can be made by altering the total neutron albedo of the inboard side of a test reactor. Albedo material is preferably of the liquid type, but may also comprise pebble, curtained stringer or flux valve forms to facilitate the degree of interaction with energetic neutrons. As will be explained more fully with reference to the preferred embodiment of FIG. 1, the neutron albedo may be altered by admitting a liquid albedo material behind the inboard wall of a toroidal plasma device. Neutron albedo can be increased by admitting liquid lead into ducts behind the inboard vessel wall, and can be reduced by admitting liquid lithium into the same ducts. Scattered neutron currents at energies greater than 300 KEV can be significantly reduced by flowing water through the inboard ducts. Reflecting materials such as lead, absorbing materials such as $^{10}B_4C$, or moderating materials such as carbon, can be introduced in the alternative forms of pebbles, microspheres or stringers, gravity fed from the top of the plasma device into vertical ducts behind the inboard vessel wall, and retrieved from the bottom of the device. Such arrangements are shown and will be further described with reference to FIGS. 2 and 3. In another alternative arrangement slabs or curtains of neutron reflectors, absorbers, or moderators can, in a typical reactor be carried by cables in a shaft some tens of centimeters deep, installed just behind the inboard vessel wall (see FIG. 4).

Examples of modified neutron spectra will now be described with reference to FIGS. 8a-8f, and table II. FIGS. 8a-8f show the energy distribution of neutrons emerging from slabs of various materials of 20-centimeters thickness, backed by 40-centimeter thick slab of stainless steel, in response to irradiation by an isotropic 14-MEV fusion neutron source. In the energy range of one to five MEV, lead has the highest albedo (FIG. 8f), while water (FIG. 8a) and $^6LiH$, lithium-6 hydride (FIG. 8c) have the lowest neutron albedo. At very low scattered energies, beryllium (FIG. 8e) has the highest neutron albedo while $^{10}B_4C$ boron-10 carbide (FIG. 8e) and lithium-6 hydride (FIG. 8c) have the lowest neutron albedo. In FIGS. 8a-8f the total albedo, $I_r$, is defined as the number of scattered neutrons per incident 14-MEV neutron, assuming an isotropic 14-MEV neutron source. In each of the figures, neutron energy, in MEV, is plotted as the abscissa, whereas neutron flux per unit lethargy is plotted on the ordinate. Here, "lethargy" is defined as the natural logarithm of the ratio of source energy (14 MEV) to neutron energy.

With reference to table II, the fraction of scattered neutrons in various energy ranges is given for the same materials as those of FIGS. 8a-8f. For the relevant tokamak dimensions which are given in Table I:

TABLE I

| | DIMENSIONS OF TOKAMAK TEST REACTORS | |
|---|---|---|
| | TFTR | FED-R |
| Major radius of plasma (m) | 2.5 | 3.5 |
| Plasma dimensions | 1.7 m diam. (circular) | 1.7 m width 2.8 m height |
| Vacuum vessel dimensions | 2.1 m diam. (circular) | 2.1 m width 3.4 m height |
| Useful irradiation test area | 4 m² | 60 m² |
| Blanket module depth | 0.4 m | 0.8–1.3 m | the angle-integrated fusion-neutron current at the outboard wall will be 15–30% greater than at the inboard wall. Accordingly, the ratio is taken here as 1.25 for illustrative purposes. The effective uncollided neutron current at the outward wall is found by adding 1.25 to the 13.5–14.9 MEV category listed in Table II:

TABLE II

| | ALBEDO PER INCIDENT 14-MEV NEUTRON (ISOTROPIC SOURCE) | | | | | | | |
|---|---|---|---|---|---|---|---|---|
| Energy Range of Reflected Neutrons (MeV) | 1-cm SS-316 Wall | Reflecting Material$^d$ | | | | | | |
| | | U-238 | Pb | Be | SS-316 | $H_2O$ | $^{10}B_4C$ | $^6LiH$ |
| 13.5–14.9 | .027 | .044 | .051 | .033 | .039 | .030 | .033 | .029 |
| 10.0–13.5 | .015 | .021 | .022 | .050 | .032 | .034 | .054 | .033 |
| 0.55–10.0 | .127 | .802 | .766 | .459 | .493 | .231 | .285 | .247 |
| 0.032–0.55 | .020 | .830 | .424 | .281 | .269 | .054 | .045 | .053 |
| 0.032 | .001 | .025 | .052 | .408 | .037 | .079 | .001 | .014 |

TABLE II-continued

| | ALBEDO PER INCIDENT 14-MEV NEUTRON (ISOTROPIC SOURCE) | | | | | | | |
|---|---|---|---|---|---|---|---|---|
| Energy Range of Reflected Neutrons (MeV) | 1-cm SS-316 Wall | Reflecting Material[d] | | | | | | |
| | | U-238 | Pb | Be | SS-316 | $H_2O$ | $^{10}B_4C$ | $^6LiH$ |
| Ratios at Outboard Wall | | | | | | | | |
| Collided Fast[b] Neutrons/$F_{14}$ | 8.7% | 49.8% | 47.5% | 31.0% | 31.9% | 16.2% | 20.7% | 17.1% |
| All Collided Neutrons/$F_{14}$ | 10.0% | 101.6% | 76.2% | 73.0% | 50.5% | 24.3% | 23.5% | 21.2% |
| Slower[c] Neutrons/$F_{14}$ | 1.3% | 51.8% | 28.7% | 42.0% | 18.6% | 8.1% | 2.8% | 4.1% |
| Slower Neutrons Fast Neutrons | 1.2% | 34.6% | 19.5% | 32.1% | 14.1% | 7.0% | 2.3% | 3.5% |

[a]Material 20 cm thick behind 1 cm SS-316, and backed by 40 cm SS-316.
[b]E 0.55 MeV
[c]E 0.55 MeV
$F_{14} = 1.607$ + Albedo of 13.5–14.9

Important results are thereby made evident. The uncollided neutron current at the outward wall can be made as large as 77% of the total current, using $^6Li H$, $^{10}B_4C$, or $H_2O$ on the inboard side. As indicated in FIG. 6, this ratio is reduced in accordance with the attenuation incurred by the first wall. The proportion of very fast neutrons, i.e., neutrons having an energy greater than 0.55 MEV, and the incident current, can be made at least 95% in the $^6Li H$ and $^{10}B_4C$ cases, and is still 91% for the $H_2O$ case. With beryllium or lead on the inboard side, the currents of uncollided neutrons is about one-half of the total neutron source available. In the case of lead, most of the collided neutrons are very fast, i.e., have energies greater than 0.55 MEV. In the case of beryllium albedo material, most of the collided neutrons are relatively slow, i.e. have energies less than 0.55 MEV.

As long as the vessel wall in front of the outboard test region is neutronically thin to fast neutrons, the neutron energy distribution at the test samples, or in extracted neutron beams will embody the features of FIGS. 8a–8f and Table II. If a change in component material is made in one sector of the torus, e.g., one octant, it will have little, if any effect on the radiation field at positions displaced 90° away in the midplane of the torus. Hence, different neutron energy distributions can be simultaneously established at the front faces of different test modules, and in extracted neutron beams.

Another technique is to surround a test assembly with unmoderated uranium, beryllium or lead of various thicknesses. The (n, fission) or (n, 2n) reactions in these materials can significantly increase the neutron flux in the test module and modify the exposure symmetry, but with some softening of the neutron spectrum. This particular albedo control technique is effective only for control of neutron flux and spectrum in a local blanket module.

Exact simulation of gamma-ray fields is of secondary importance in a tokamak radiation effects test facilities because many other facilities, such as Linacs, offer gamma fields of much higher intensity. However, a substantial gamma field will exist in the tokamak environment, and there may be a requirement to suppress it in order that neutron damage effects can be more completely isolated. The prompt gamma rays are due to fast neutrons striking reactor components, especially those containing medium-density metals such as iron or copper. The calculated gamma dose just outside the TFTR vacuum vessel, for example, is about 25% of the neutron dose, according to an article entitled, "Nuclear Radiation Analysis for TFTR", by L. P. Ku, Princeton Plasma Physics Laboratory report PPPL-1711, September 1980. Changes in materials at the inboard side of a test reactor, according to the invention, may be accompanied by large changes in the ratio of gamma-ray dose (rads) to the neutron dose (rads) in the test modules. For example, the ratio is calculated to increase from about one-fourth, when the inboard material is lead, to about one-half, when the lead is replaced by water. The ratio can also be increased or decreased with less independence upon the change in the neutron spectrum, by an appropriate choice of materials and components at the outboard, top and bottom regions of the test reactor. For example, the gamma-to-neutron ratio can be decreased by using certain materials of low atomic mass, such as beryllium and silicon carbide, as first-wall materials.

Figure 9:
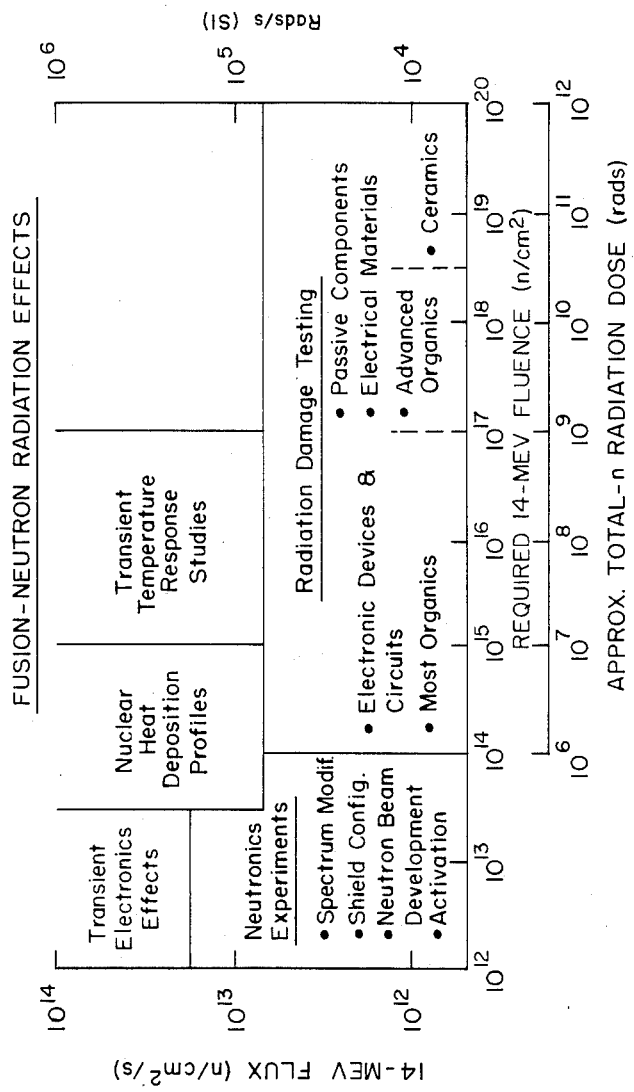
FIG. 9 shows fusion-neutron radiation effects, for the materials of FIGS. 8a-8f.

FIG. 9 shows the neutron dose rates and integrated doses needed for various radiation effects tests. As shown in Table III:

TABLE III

| TYPICAL RADIATION LEVELS AT FRONT FACE OF TEST MODULE | | |
|---|---|---|
| | TFTR (1985–86) | FED-R (1990–95) |
| Fusion Neutron Current (n/cm²/s) | $1 \times 10^{12}$–$1 \times 10^{13}$ | $6 \times 10^{12}$–$2 \times 10^{13}$ |
| Fast Neutron Flux (n/cm²/s @ E ≧ 0.5 MeV) | $3 \times 10^{12}$–$3 \times 10^{13}$ | $2 \times 10^{13}$–$6 \times 10^{13}$ |
| Total Neutron Dose Rate, rad (Si)/s (all energies) | $1 \times 10^4$–$1 \times 10^5$ | $6 \times 10^4$–$2 \times 10^5$ |
| Gamma Dose Rate, rad (Si)/s (mean energy 1 MeV) | $3 \times 10^3$–$3 \times 10^4$ | $2 \times 10^4$–$6 \times 10^4$ |
| Soft X-Ray Flux (W/cm²) | 0.5 to 3 | 1 to 5 |
| Pulse Length (s) | 0.5 | ≧ 100 |
| Integrated Neutron Dose | Lifetime Dose $10^6$ rad (Si) | Weekly Dose = 1 to $3 \times 10^{10}$ rad (Si) |

TABLE III-continued
TYPICAL RADIATION LEVELS AT FRONT FACE OF TEST MODULE

|  | TFTR (1985-86) | FED-R (1990-95) @ 25% Duty Factor |
|---|---|---| most of the ranges of interest would be covered by the proposed FED-R fusion reactor described above. With operation of this facility at a 25% duty factor, the weekly neutron fluence at the first wall would be $1-3 \times 10^{18}$ n/cm² (uncollided) and the integrated weekly dose would be $1-3 \times 10^{10}$ rads (for silicon).

The relatively low neutron flux, but long pulse length (seconds to steady state) and consequently high integrated dose, imply that tokamak test reactors are best suited for determining the permanent damage of neutron and gamma radiation to dose-dependent devices and subsystems. Nevertheless, transient effects on devices that are damaged by fast-neutron fluxes as low as $2 \times 10^{13}$ n/cm²/s or by gamma-ray doses as low as $10^5$ rads/s can also be evaluated.

Both tokamaks and pulsed fast reactors can irradiate large components and subsystems. The advantages of a fast-neutron burst reactor are that it is many times less costly and can give a much higher dose rate (up to $10^8$ rads/s as short distances from the core), so that dose-dependent effects can be observed for a much larger variety of samples. The advantages are further elaborated in: "Fast Flux Reactors in the U.S.A.", I. T. F. Wimett, in *Pulsed Neutron Research*, IAEA Vienna of 1965, Vol. II, pp. 529-552; and the articles in the book *Fast Burst Reactors* U.S.A.E.C. CONF-690102 (1969). In the case of large external targets, however, the total fast-neutron fluence, per pulse, is limited to about $10^{14}$ n/cm², which is comparable with that given by a few seconds of tokamak operation. A pulsed fast-neutron fission reactor can also provide up to $10^{15}$ n/cm²/pulse in an internal "glory hole" of relatively small dimensions. However, the higher cost of a tokamak simulation facility is warranted because the ambient neutron spectrum in a tokamak originates from a 14-MEV DT source, and can be made characteristic of that of any fusion environment, while damage effects caused by a pulsed fast reactor spectrum must, in general, be extrapolated. Also, the number of pulses per day in a pulsed-fast reactor is limited by the thermal excursion experienced in each pulse. A tokamak simulation facility (radiation effects test facility) can generate a daily integrated neutron dose at least 100 times larger than that of a pulsed fast reactor as set forth in Table III.

An albedo control system, comprising layered albedo control materials located on the inboard wall of a toroidal plasma device (such as that shown in FIG. 4c), will now be described. This arrangement finds particular application in the field of tritium breeding in a fusion reactor. Several motivations exist for eliminating tritium breeding inboard of the plasma in a low-aspect-ratio toroidal fusion reactor. It is difficult to access inboard regions of a toroidal device for maintenance or for batch processing. Also, the freedom to minimize the thickness between the vacuum vessel and the inboard toroidal field coil leg is extremely limited, thereby restricting the magnitude of the magnetic field at the plasma. Also, relatively expensive breeding assemblies could be replaced by cheaper shielding materials (e.g., stainless steel and water) if no inboard breeding were required. Further, it is desirable to minimize the volume of blanket that must be processed and safeguarded against tritium release. It is also desirable to maximize the tritium breeding ratio in situations where breeding is restricted to the outboard region of the torus. According to the invention, compositions of the inboard and outboard zones are chosen to minimize neutron multiplication, and the reflection of neutrons from the inboard to the outboard regions. Further, breeding at the small major-radius side is eliminated, and the neutron multiplying material (beryllium, lead, or $^{238}U$) is made homogeneous with respect to the lithium breeder. A neutron multiplying layer placed in front of the breeder tends to reduce the tritium breeding ratio (TBR) because most of the neutrons reflected from the inboard region have energies below the multiplication tresholds, and are often absorbed in the multiplier. The tritium breeding ratio (TBR) is defined as the number of tritons bred per source fusion neutron. When depleted uranium is used as the multiplier, enriched lithium (e.g. $^6Li$) must be used in the breeder to increase the ratio of tritium breeding to plutonium breeding. Transport calculations for the one-dimensional geometry shown in FIG. 4c are carried out using the ANISN code and $P_3-S_8$ approximation, as explained in "ANISN-PPL: Multigroup One-dimensional Discrete Ordinates Transport Code with an Isotropic Scattering and Provision for Binary Output", CCC-253, RSIC, Oak Ridge National Lab, 1975. As can be seen with reference to Table IV:

TABLE IV
TRITIUM BREEDING RATIOS
(Outboard Breeding Zone Only, Except in Cases 1, 2, and 3)

| Case | First Wall & Inboard Reflector | Inboard Multiplier | Multiplier Thickn. d (cm) | Outboard Breeder Composition[a] (by Volume) | Breeder Thickn. (cm) | T6 | TBR |
|---|---|---|---|---|---|---|---|
| 1 | Void | 100% Li | 60 | 100% Li | 125 | 0.96 | 1.69 |
| 2 | Void | 80% Li, 20% Be | 60 | 80% Li, 20% Be | 125 | 1.67 | 2.12 |
| 3 | Void | 10% D.U.[b] 90% Enr. Li | 60 | 10% D.U. 90% Enr. Li | 125 | 1.95 | 1.99 |
| 4 | Void | Be | 60 | 80% Li, 20% Be | 60 | 1.61 | 1.96 |
| 5 | Void | Pb | 60 | 80% Li, 20% Be | 60 | 1.55 | 1.89 |
| 6 | SS[c] | Be | 20 | 100% Li | 60 | 0.83 | 1.24 |
| 7 | SS | Pb | 20 | 100% Li | 60 | 0.88 | 1.28 |
| 8 | SS | Be | 20 | 90% Li, 10% Be | 60 | 1.04 | 1.38 |
| 9 | SS | Be | 20 | 80% Li, 20% Be | 60 | 1.21 | 1.48 |

TABLE IV-continued
TRITIUM BREEDING RATIOS
(Outboard Breeding Zone Only, Except in Cases 1, 2, and 3)

| Case | First Wall & Inboard Reflector | Inboard Multiplier | Multiplier Thickn. d (cm) | Outboard Breeder Composition[a] (by Volume) | Breeder Thickn. (cm) | $T_6$ | TBR | |
|---|---|---|---|---|---|---|---|---|
| 10 | SS | Be | 20 | 80% Li, 20% Be | 60 | 0.97 | 1.13 | (Slab geom.) |
| 11 | SS | Pb | 20 | 90% Li, 10% Be | 60 | 1.10 | 1.43 | |
| 12 | SS | Pb | 20 | 80% Li, 20% Be | 60 | 1.28 | 1.55 | |
| 13 | Zr | Pb | 20 | 80% Li, 20% Be | 60 | 1.43 | 1.71 | |
| 14 | SS | None | 0 | 80% Li, 20% Be | 60 | 1.13 | 1.40 | |
| 15 | SS | None | 0 | 80% Li, 20% Be | 60 | 0.82 | 0.97 | (Slab geom.) |
| 16 | SS | Pb | 20 | 100% Enr. Li | 60 | 1.06 | 1.10 | |
| 17 | SS | Pb | 20 | 5% D.U. 95% Enr. Li | 60 | 1.36 | 1.39 | |
| 18 | SS | Pb | 20 | 10% D.U. 90% Enr. Li | 60 | 1.58 | 1.60 | |
| 19 | Zr | Pb | 20 | 10% D.U. 90% Enr. Li | 60 | 1.73 | 1.76 | |
| 20 | SS | Pb | 20 | 20% D.U. 80% Enr. Li | 60 | 1.84 | 1.86 | |

[a] Natural lithium unless noted, enriched Li = 90% $^6$Li, 10% $^7$Li
[b] D.U. = depleted uranium (0.25% $^{236}$U)
[c] SS = stainless steel Type 316 the toroidal geometry results in an increase in TBR of 30%–40%, compared with the slab geometry case (see FIG. 4) with breeding on the outboard side only. This increase is due to higher neutron current on the outboard side in a small aspect ratio torus and also to larger outboard first-wall area (cases 9, 10, 14, and 15). It is also noted that an addition of lead to the breeder results in a negligible increase in TBR. However addition of beryllium to the breeder results in a significant increase in TBR (as seen in cases 6, 8, 9, 7, 11, and 12 of Table IV.) TBR is increased by 0.08 and 0.15 when beryllium or lead respectively replaces the front-most 20 centimeters of the inboard type 316 stainless steel reflector, as set forth in Table IV, cases 9, 12, and 14. TBR is further increased by 0.16 when type 316 stainless steel first wall and inboard reflector members are replaced with Zircaloy, as can be seen in cases 12 and 13 of Table IV. TBR can be increased to approximately 1.9 when the entire 60-centimeter inboard reflector is comprised of lead or beryllium, as set forth in Table IV, cases 4 and 5. This is close to the TBR value of 2.12 obtained when a breeding zone of 80% lithium and 20% beryllium is placed in both the inboard and outboard regions, as set out is case 2. The first wall is absent in these cases, however. A depleted uranium concentration in the breeder of 9% gives the same TBR as a 20% beryllium concentration as can be seen in cases 17–19. In general, in the absence of an inboard tritium breeding zone, and when there are no outboard penetrations, a global TBR of at least 1.7 can be obtained with a lead multiplier/reflector in the inboard region, with beryllium or depleted uranium mixed homogeneously in the outboard lithium zone, and with a Zircaloy first wall. This TBR is sufficiently large to insure tritium self-sufficiency when realistic blanket structure and penetrations are included. Thus, it can be seen that tritium breeding on the inboard wall of a toroidal fusion reactor can be minimized utilizing the present invention.

Having set forth a general description of the albedo control according to the present invention, specific albedo control arrangements will now be described with reference to FIGS. 1–5, wherein the same toroidal plasma device is equipped with liquid, pebble, stringered, layered-curtain, and flux valve types of neutron, particular albedo control materials. In the toroidal plasma device 100, of FIG. 1, a toroidal field coil 10 encircles a vacuum vessel 20 which contains a plasma, denoted by the numeral 30, comprising a source of 14 MEV neutrons. Surrounding vacuum vessel 20 are shielding wall members 40 and hollow wall sections (serving as albedo conduit members) 50a and 50b adjacent the inner-most wall and floor portions of vacuum vessel 20, respectively. Radiation test modules 60 are located adjacent the outboard portions of vacuum vessel 20, and are confined within vertical wall portions of shielding member 40. A pumping duct 70 is provided adjacent to the floor of vacuum vessel 20 for the removal of impurities as well as fuel particles and fusion products flowing out of the plasma. Poloidal field coils 80a, 80b assist in the confinement of plasma within the vacuum vessel. Machine center line 90 comprises the axis of rotation for toroidal plasma device 100.

Figure 1B:
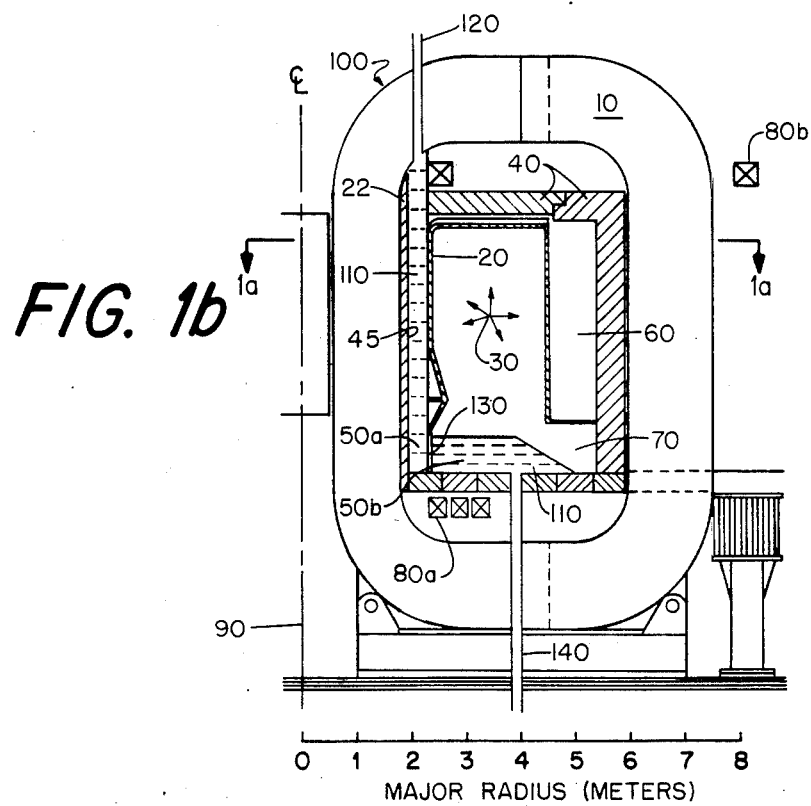

In the preferred embodiment of FIG. 1, a liquified albedo control material 110 is introduced in inlet pipes 120, and travels downward through vertical ducts 45 located in wall section 50a, flowing through baffle plate 130 into conduit-like floor section 50b. Material 110 exits through outlet pipe 140 to an external system, not shown, where it is reconditioned and/or recirculated to inlet pipe 120. As explained above, the liquid albedo control materials may comprise water, molten salts, or liquid metals Pb, Li or Na, for example.

Figure 2A:
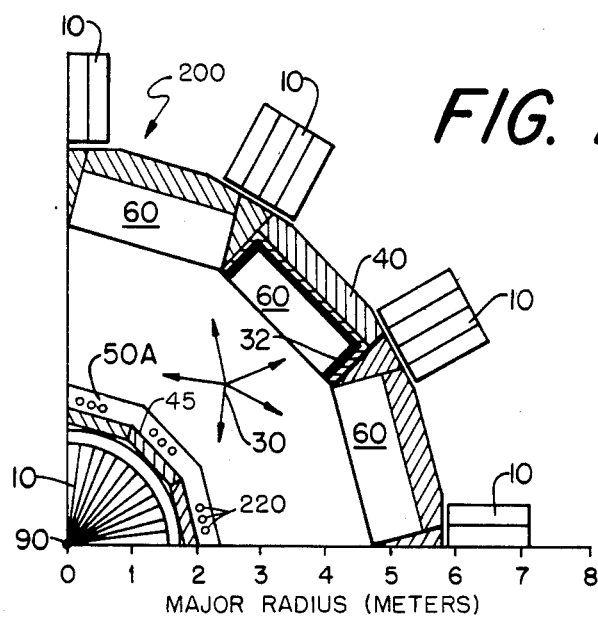
Figure 2B:
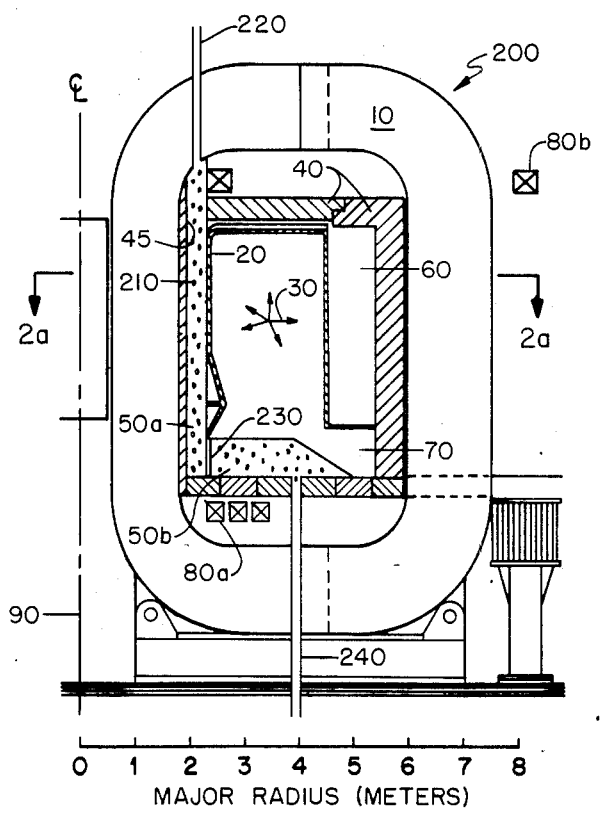

In the alternative embodiment of FIG. 2, a toroidal plasma device 200 includes albedo control material 210 in a solid pebblized form, entering inlet pipe 220, passing through ducts 45 located in wall section 50a. Thereafter material 210 passes through baffle plate 230 into conduit-like floor section 50b, exiting through outlet pipe 240. The pebblized albedo control material may thereafter be reconditioned or may be recirculated back to inlet pipe 220 for subsequent passes through toroidal device 200. Examples of albedo control material 210 include beryllium, uranium oxide, or various carbides, which would be gas-cooled as explained above.

Figure 3A:
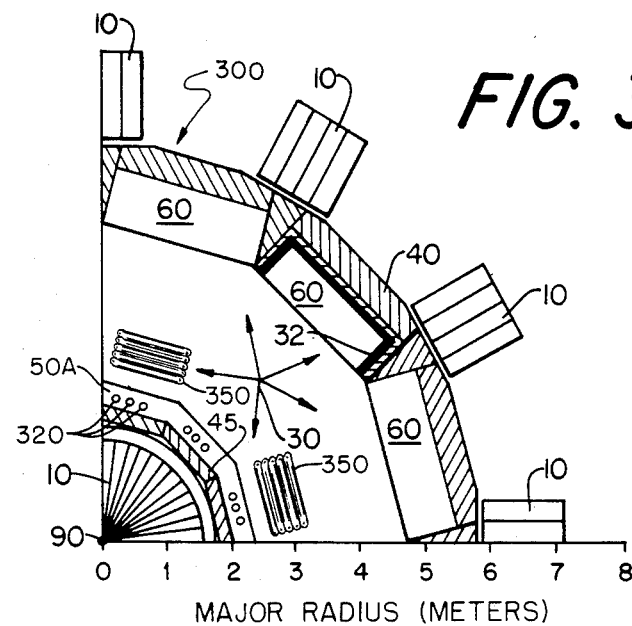
Figure 3B:
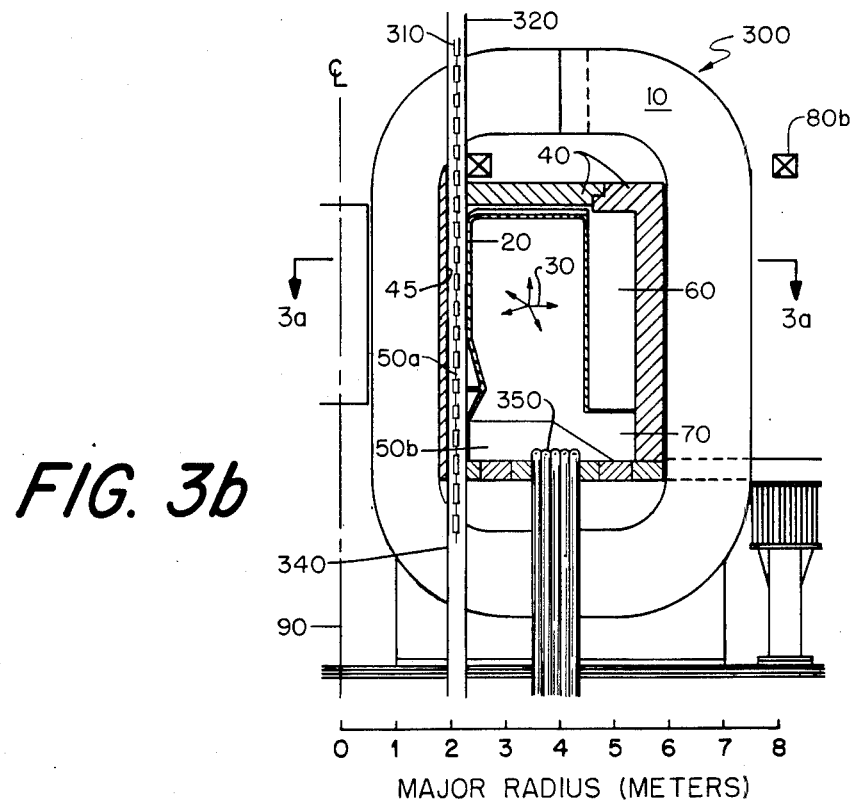

With reference to FIG. 3, toroidal plasma device 300 includes a stringer-type albedo control arrangement according to the invention, wherein the solid albedo control material comprise stringers or linked chains 310 wherein the linkages are secured to discrete solid portions (slugs) of albedo control material. Alternatively, the linkages are secured to neutron-transparent hollow shells (e.g., aluminum) containing solid albedo control material. Albedo control material may also take the form of an open-link chain, formed of links of albedo control material. For introduction of albedo control material in vertical directions in toroidal plasma device 300, the stringer 310 is introduced in upper vertical inlet pipe 320, proceeds through ducts 45 located in wall section 50a, and exits through outlet pipe 340. Stringer 310 may be comprised of sections of varying albedo control material. When such is the case, outlet pipe 340 allows one section of stringer 310 to pass through duct 45, so that another section can come into neutron-modifying communication with the neutrons of plasma 30. Additional albedo control may be introduced in the floor portion 50b of reactor 300 through generally u-shaped conduits or tubes 350, which in their horizontal extent, lie parallel to floor 50b. Stringer-type albedo control members are guided by conduits 350 for introduction and withdrawal during reactor reconfiguration.

In any of the proceeding arrangements of FIGS. 1-3 the neutron albedo control material is configured to form a plurality of laterally adjacent vertical columns, so as to form a planar, curtain-like member.

Figure 4A:
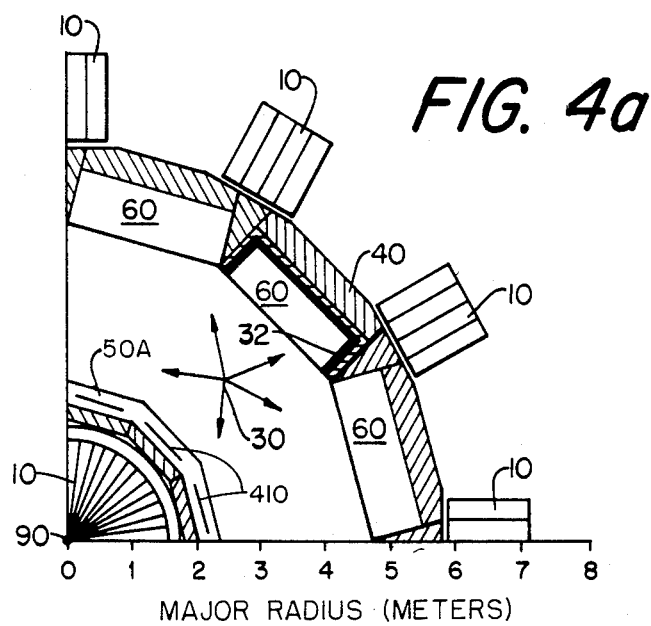
Figure 4B:
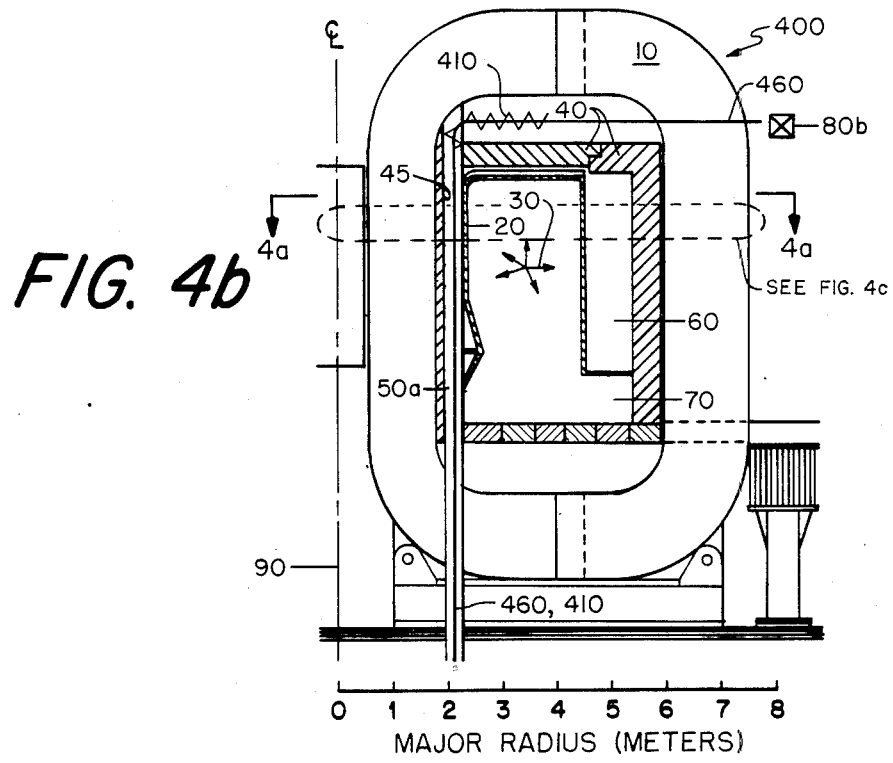

FIGS. 4a-4c show a layered curtain or slab arrangement of albedo control material 410 in toroidal plasma device 400. Layered albedo control material is arranged in the form of hinged slabs or curtains 410, and is stored on the top of reactor 400 between toroidal field coil 10 and shield wall 40, using any suitable conventional system of storage. For example, individual panels or slabs could be linked together so as to follow, at their free edges, at generally vertically extending guides which include a 90° turn near the ceiling portion of wall 40. The guide would facilitate stacking of the panels atop vacuum vessel 20. Alternatively the panels could comprise a folded zig-zag construction, such as that shown in FIG. 4b. In this arrangement, cables 460 would extend through central portions of each panel-like section, facilitating a compact stacking upon retrieval of the control material, with subsequent storage on top of vacuum vessel 20. A control cable 460 extends adjacent the top and interior vertical side of vacuum vessel 20. When a downward force is imparted to the bottom of control cable 460, albedo control material is introduced in vertical wall section 50a, so as to reconfigure device 400. If removal of albedo control is desired, a reversing force is applied to the top of control cable 460, whereupon the lower-most portion of curtain 410 is retracted in an upward direction along vertical wall section 50a so as to be stored atop the ceiling portion of shielding wall member 40.

FIG. 4c shows a partial cross-section of the layered configuration of extended curtains 410, wherein the reactor component thicknesses are shown in centimeters. In this arrangement, the test module 60 comprises a tritium breeding zone of 60 centimeters thickness, located adjacent the outboard vacuum vessel wall 20 of the plasma device. The vacuum vessel 20 comprises first walls which are one centimeter thick, are 300 centimeters apart, and contain a 100 centimeter thick fusion neutron source 30 (which is somewhat thinner than the plasma). The albedo material 410 in this embodiment comprises two inboard layers, namely layer 410b of stainless steel type 316 and layer 410a of beryllium or lead neutron multiplier material. Other suitable materials have been described above. The combined thickness of layers 410a, 410b is 60 centimeters, wherein the thickness of neutron multiplier layer 410a has a thickness ranging between 20 and 50 cm. In this embodiment, stainless steel type 316 layer 410b comprises an inboard reflector. Performance of this albedo control arrangement for varying albedo material configurations is summarized in the aforementioned Table IV.

The multilayer neutron albedo construction of FIG. 4c is shown for the curtain arrangement of FIGS. 4a 4b. However, other arrangements encompassed by the present invention, such as is shown in FIGS. 1-3, could also incorporate the multilayer construction, and such modification can be readily accomplished by those skilled in the art.

Figure 5A:
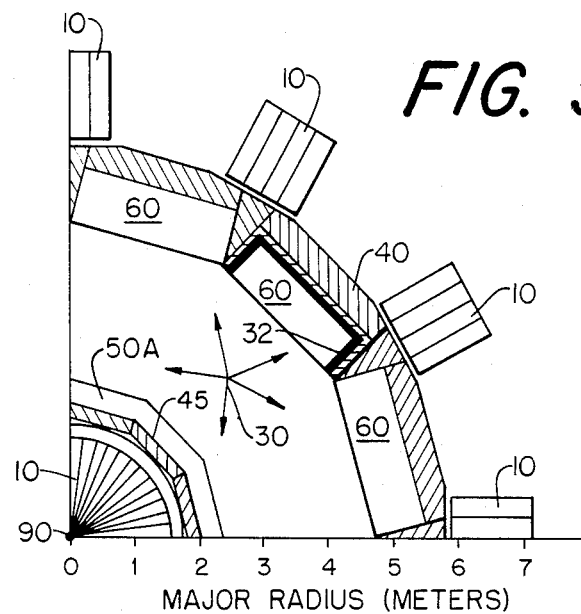
Figure 5B:
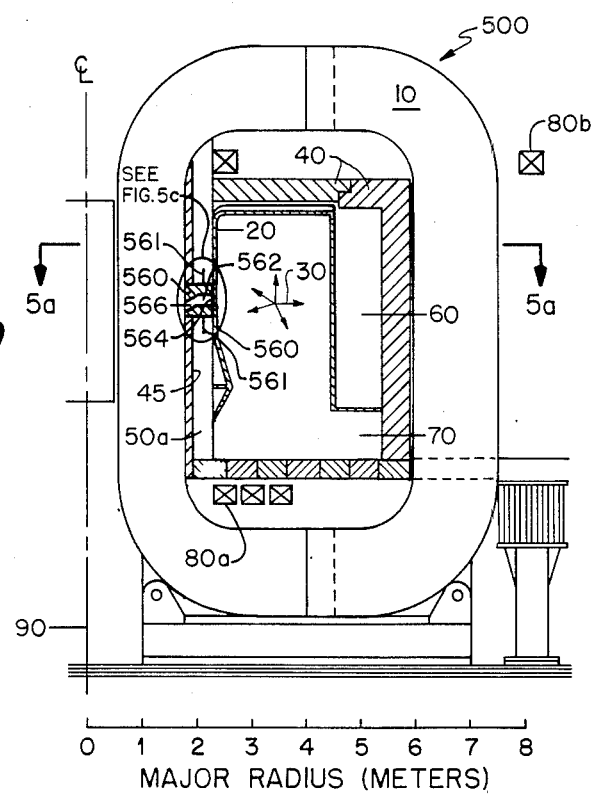

With reference to FIG. 5 a control valve type of albedo control is illustrated. Control valve 560 is comprised of neutron reflecting material having a centrally located relatively neutron-transparent channel 562 therein. Flux valve 560 is mounted for rotation about a vertical axis, as indicated by pivot supports 561. Flux valve 560 is located in the inboard portion of reactor 500 such that outboard end portion 564 of channel 562 communicates with the plasma, and inboard portion of reactor 500 which contains a neutron load. According to the invention, neutron control valve 560 is rotated 90° in a vertical plane to assume the position shown in FIG. 5b, wherein channel 562 will no longer communicate with plasma contained within reactor 500, and hence, albedo is increased.

The variable control arrangement of the present invention allows modification to the fusion device during operation thereof, but does not comprise a transient control system. Rather, the term "variable", when used to describe the present invention, indicates a control system which provides changes between steady-state operating conditions of the fusion device, and wherein operating conditions during the in-between times of change are not controlled by the present invention. The changes provided by the present invention do not comprise a transient control of the fusion device, since fusion device modifications of the present invention take place over arbitrary long periods of time relative to transient phenomena experienced during fusion device operation. Typical change-over times for the present invention occur over at least one minute, whereas transient phenomena occur over fractions of a second to several seconds.

One skilled in the art can configure the albedo transport systems of FIGS. 1-5 with any material or combination of neutron albedo materials described above, to achieve the particular performance described. The use of other neutron albedo materials and other albedo transport systems will become apparent upon consideration of the foregoing, and the present invention is not intended to be limited to the particular examples cited above.

The embodiments of the invention in which an exclusive property or privilege is claimed are defined as follows:

1. In a toroidal fusion plasma device, including a vacuum vessel for confining a plasma which contains fusion neutrons, said vacuum vessel having inboard and outboard walls, an arrangement for varying, between steady state operating modes, one of said flux and said energy spectrum of said fusion neutrons which are incident on said outboard wall, said arrangement comprising:

neutron reflective material exclusively disposed immediately adjacent said inboard wall so as to reflect ones of said fusion neutrons having a predetermined flux and energy spectrum onto a predetermined portion of said outboard wall; and means for positioning said neutron reflective material into and out of communication with said fusion neutrons, whereby at least one of said flux and said energy spectrum of said fusion neutrons which are incident on said outboard wall is varied when said albedo material is in communication with said fusion neutrons.

2. The arrangement of claim 1, wherein said neutron reflective material is positionable in a vertical direction so as to be brought into and out of neutron modifying communication with said plasma.

3. The arrangement of claim 2 wherein said neutron reflective material comprises a liquid neutron reflector material which is flowed in vertical directions immediately adjacent said inboard wall.

4. The arrangement of claim 3 further comprising means for sequentially positioning a succession of different neutron reflective materials into and out of communication with said fusion neutrons.

5. The arrangement of claim 2 wherein said neutron reflective material comprises a plurality of pebbles of neutron reflective material which is flowed in vertical directions immediately adjacent said inboard wall.

6. The arrangement of claim 2 wherein said neutron reflective material comprises a curtain of neutron reflective material which is moved in vertical directions immediately adjacent said inboard wall.

7. The arrangement of claim 2, wherein said neutron reflective material comprises a chain of neutron reflective material links, said chain movable in vertical directions immediately adjacent said inboard wall.

8. The arrangement of claim 1 further comprising a neutron flux valve of neutron reflective material disposed immediately adjacent said inboard wall, said flux valve having a central passageway therein for providing a path of neutron transmission between said vacuum vessel and a neutron load means, said flux valve rotatable about a vertical axis so as to remove access of said vacuum vessel to the neutron transmission path.

9. The arrangement of claim 1 wherein said neutron reflective material comprises neutron moderator material.

10. The arrangement of claim 1 wherein said neutron reflective material comprises neutron multiplying material.

11. The arrangement of claim 1, wherein said neutron reflective material comprises a plurality of layers of different neutron reflective materials having different neutron reflective properties, said layers cooperating so as to combine their different neutron reflective properties to produce a resultant neutron reflective property which is substantially different from said neutron reflective properties.

12. The arrangement of claim 1, wherein said fusion plasma device further comprises a floor said floor including conduits through which said neutron reflective material is moved into and out of communication with said fusion neutrons.

13. In a tokamak radiation effects facility which includes a vacuum vessel for confining a plasma which contains fusion neutrons, said vacuum vessel having inboard and outboard walls, an improved neutron irradiation control arrangement comprising:

a test region located in a predetermined portion of said outboard wall for containing a test specimen to be irradiated by fusion neutrons incident thereon; and means for enhancing the neutron dose rate and for controlling the flux and energy spectrum of fusion neutrons incident on said test region, comprising neutron reflective material exclusively disposed immediately adjacent said inboard wall so as to reflect ones of said fusion neutrons having a predetermined flux and energy spectrum onto said test region, and means for positioning said neutron albedo material into and out of communication with said fusion neutrons, whereby at least one of said flux and said energy spectrum of said fusion neutrons which are incident on said outboard wall is varied when said neutron material is in communication with said fusion neutrons.

14. The arrangement of claim 13 further comprising means for controlling the gamma radiation incident upon said test region.

15. The arrangement of claim 13, wherein said neutron reflective material is positionable in a vertical direction so as to be brought into and out of neutron modifying communication with said plasma.

16. The arrangement of claim 15 wherein said neutron reflective material comprises a liquid neutron reflective material which is flowed in vertical directions immediately adjacent said inboard wall.

17. The arrangement of claim 16 further comprising means for positioning a succession of different neutron reflective materials into and out of communication with said fusion neutrons.

18. The arrangement of claim 13 wherein said neutron reflective material comprises neutron moderator material.

19. The arrangement of claim 15 wherein said neutron reflective material comprises neutron multiplying material.

20. In a toroidal fusion plasma device, including a vacuum vessel having inboard and outboard walls, an arrangement for extracting a neutron beam from said toroidal fusion plasma device, said arrangement comprising:

neutron reflective material disposed immediately adjacent said inboard wall so as to reflect ones of said fusion neutrons having a predetermined flux and energy spectrum onto a predetermined portion of said outboard wall; and means for positioning said neutron reflective material into and out of communication with said fusion neutrons, such that at least one of said flux and energy spectrum of said fusion neutrons which are incident on said outboard wall is varied when said neutron reflective material is in communication with said fusion neutron, such that an extractable neutron beam of predetermined flux and energy spectrum is developed at said outboard wall.

* * * * *